No. 652,365. Patented June 26, 1900.
W. JAMES.
PRESSURE CUT-OFF FOR GAS BURNERS.
(Application filed Oct. 30, 1899.)
(No Model.)
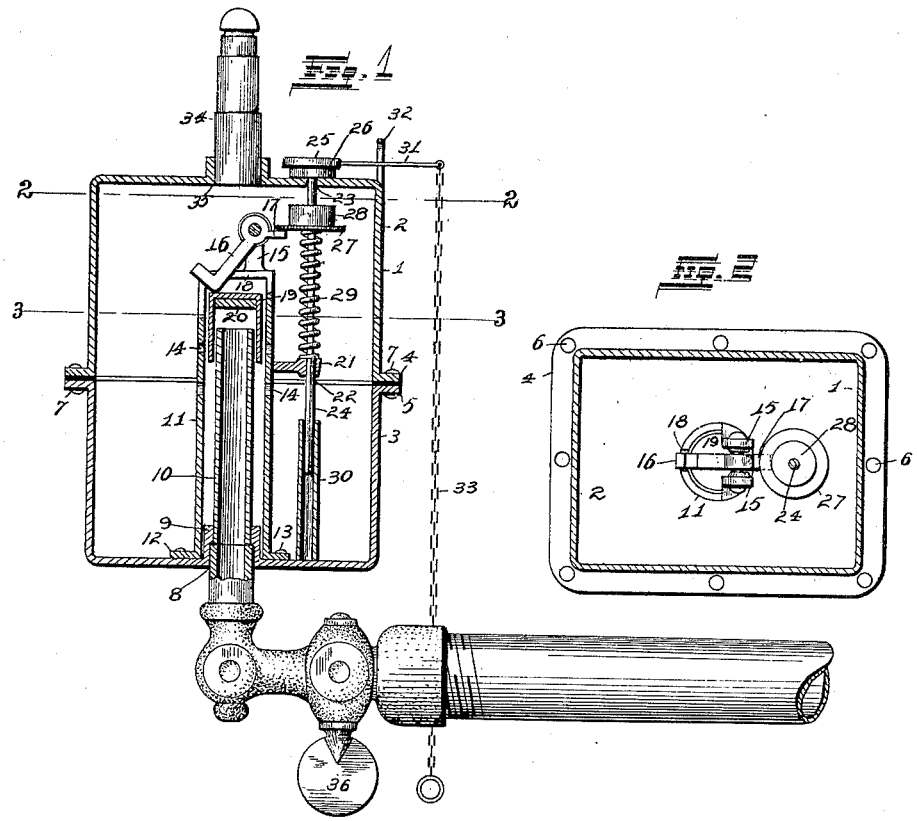
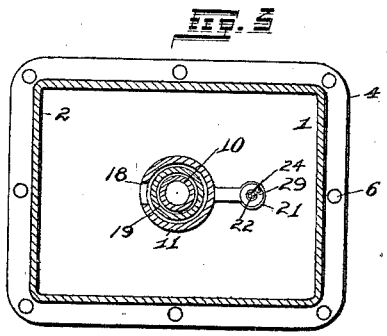
Witnesses:
Alfred A. Eicks
J. D. Rippey
Inventor:
William James
By Higdon & Longan, Att'ys

United States Patent Office.

WILLIAM JAMES, OF ST. LOUIS, MISSOURI, ASSIGNOR OF ONE-FOURTH TO S. J. WARD, OF MEMPHIS, TENNESSEE.

PRESSURE CUT-OFF FOR GAS-BURNERS.

SPECIFICATION forming part of Letters Patent No. 652,365, dated June 26, 1900.

Application filed October 30, 1899. Serial No. 735,214. (No model.)

*To all whom it may concern:*

Be it known that I, WILLIAM JAMES, of the city of St. Louis, State of Missouri, have invented certain new and useful Improvements in Automatic Cut-Off Valves for Gas-Supply Pipes, of which the following is a full, clear, and exact description, reference being had to the accompanying drawings, forming a part hereof.

This invention relates to automatic cut-off valves for gas-supply pipes; and it consists of the novel construction, combination, and arrangement of parts hereinafter shown, described, and claimed.

The object of this invention is to provide an automatic cut-off valve for gas-supply pipes which when the flow of gas is stopped from any cause automatically closes the escapement-valve, thereby preventing a continuation of the flow until the escapement is reopened by some external agency.

Figure 1 is a vertical sectional view showing the arrangement of the component parts of my invention. Fig. 2 is a horizontal sectional view on the line 2 2 in Fig. 1. Fig. 3 is a horizontal sectional view on the line 3 3 in Fig. 1.

In the construction of my invention I provide a rectangular metallic case 1, consisting of two parts 2 3, on the meeting edges of which are the flanges 4 5. Through these flanges are a plurality of threaded apertures 6 for the screws 7, which serve to hold the two parts securely together. In the bottom of the case thus formed is a threaded aperture 8, and extending inwardly around said aperture is the threaded flange 9. Into this aperture is threaded the tube 10.

11 is a tube having a flange 12 at the bottom, apertures through said flange, and screws 13 passing through said apertures and securing said tube to the bottom of the case 1. A plurality of apertures 14 are provided in the side of said tube, the purpose of which is hereinafter described. An integral upwardly-extending standard 15 is provided on one side of the tube 11, to which is pivoted the locking-lever 16, integral with which is the projection 17. The lever 16 operates in a slot 18 in the top of the tube 11.

A cap 19, having a rubber packing 20 in its upper end, fits loosely over the tube 10, and the lower end of the lever 16 rests on the top of said cap. The cap 19 is retained in its position over the top of the tube 10 by the tube 11.

A support or standard 21, having an aperture 22 in its outer end, is soldered or otherwise secured to the side of the tube 11. In direct vertical alinement with the aperture 22 is the aperture 23 in the top of the case 1. A rod 24 passes through these apertures and is provided on its upper end with a metallic plate 25, below which is secured a rubber valve 26. A similar plate 27 is rigidly secured to the rod 24 inside the case 1 and is likewise provided with a rubber valve 28 on its upper surface. A coil-spring 29 is provided around the rod 24, the lower end of which rests on the standard or support 21 and the upper end against the plate 27. Said spring when in its normal or expanded position presses the rod 24 upward, thereby forcing the valve 28 closely against the top of the case 1. The lower end of the rod 24 projects into a tube 30 in direct vertical alinement with the apertures 22 23. A rod 31 is rigidly secured to the plate 25, projects outwardly through a guide-loop 32, and is provided with a small chain 33, which is attached to its outer end. A gas-jet 34 is threaded into an aperture 35 in the top of the case 1.

The operation of the device is as follows: When the valve 36 is opened, the gas flows into the tube 10. There further passage is prevented by the cap and packing 19 20, which is held securely pressed over the top of the tube 10 by the locking-lever 16, which assumes a vertical position when the rod 24 is in its normal or upper position. When it is desired to light the gas, the chain is engaged and pulled downwardly, thereby forcing the rod 24 downwardly, together with the parts thereto joined. The plate 27 comes in contact with the projection 17 on the lever 16, and the free end of said lever is raised in the position shown in the drawings. The pressure of the gas from within the tube 10 raises the cap 19, and the gas escapes into the tube 11, thence through the apertures 14 into the case 1, and upwardly through the jet 34, which may then be lighted. When the chain 33 is disengaged, the rod 24 is again forced upwardly, the valve 28 being pressed against the case 1, thereby preventing the escape of gas through the aperture 23. When the lever 16 and cap 19 have been thus positioned, the pressure of the gas retains them there; but when by any means the flow of gas is prevented they sink again into their normal position, and the external agency must again operate to raise the lever 16 before the gas will again flow. By these means the escape of gas through defective valves is obviated. This device may be applied to the gas-pipe at any place, and it is not necessary that it be applied near the terminal of said pipe.

A device of this kind is very simple, easily applied in any position desired, and costs little in manufacture. Much inconvenience and danger to life may be obviated by use of these appliances, which are believed to present many advantages over other devices of this nature.

I claim—

1. A cut-off valve for gas-supply pipes, comprising a case, an escapement-tube projecting into said case, a cap fitting over said tube, a perforated tube fitting over and around said tube and cap, a locking-lever pivoted to a projection from said perforated tube and operating in a slot in the top of said tube, said locking-lever normally locking the cap over the top of the escapement-tube, and a means whereby the cap and locking-key may be thrown into an unlocked position, substantially as specified.

2. In a device of the class described, a device for unlocking the lever 16 and the cap 19, consisting of a rod projecting through an aperture in the top of the case, suitable rubber valves attached to plates above and below the top of the case, the lower of which plates when lowered presses an arm of the locking-lever downwardly thereby raising and unlocking the other arm of the lever, a spring which normally holds the lower of said plates closely against the top of the case, and an arm attached to the upper of said plates for lowering said rod, substantially as and for the purpose specified.

In testimony whereof I affix my signature in presence of two witnesses.

WILLIAM JAMES.

Witnesses:
JOHN C. HIGDON,
JOHN D. RIPPEY.